US011408633B2

(12) United States Patent
Jiao et al.

(10) Patent No.: US 11,408,633 B2
(45) Date of Patent: Aug. 9, 2022

(54) MULTI-SPLIT AIR CONDITIONING SYSTEM AND CONTROL METHOD THEREFOR

(71) Applicants: Gree Electric Appliances (Wuhan) Co., Ltd., Wuhan (CN); Gree Electric Appliances, Inc. of Zhuhai, Zhuhai (CN)

(72) Inventors: Huachao Jiao, Zhuhai (CN); Shiqiang Zhang, Zhuhai (CN); Lianfa Wu, Zhuhai (CN); Jianguo Xiong, Zhuhai (CN); Bing Zhou, Zhuhai (CN); Zhiguang Huang, Zhuhai (CN); Donghui Li, Zhuhai (CN); Bo Qiu, Zhuhai (CN)

(73) Assignees: Gree Electric Appliances (Wuhan) Co., Ltd., Hubei (CN); Gree Electric Appliances, Inc. of Zhuhai, Guangdong (CN)

( * ) Notice: Subject to any disclaimer, the term of this patent is extended or adjusted under 35 U.S.C. 154(b) by 123 days.

(21) Appl. No.: 16/645,209

(22) PCT Filed: Sep. 6, 2018

(86) PCT No.: PCT/CN2018/104344
§ 371 (c)(1),
(2) Date: Mar. 6, 2020

(87) PCT Pub. No.: WO2019/047889
PCT Pub. Date: Mar. 14, 2019

(65) Prior Publication Data

US 2020/0292199 A1 Sep. 17, 2020

(30) Foreign Application Priority Data

Sep. 7, 2017 (CN) ......................... 201710800560.9

(51) Int. Cl.
*F24F 11/86* (2018.01)
*F24F 11/77* (2018.01)

(52) U.S. Cl.
CPC .............. *F24F 11/86* (2018.01); *F24F 11/77* (2018.01)

(58) Field of Classification Search
CPC ......... F24F 11/86; F24F 11/77; F25B 31/004; F25B 2500/16; F25B 2500/23; F25B 2500/24
See application file for complete search history.

(56) References Cited

U.S. PATENT DOCUMENTS

2003/0051494 A1 3/2003 Ohya
2003/0074914 A1* 4/2003 Hirakanu ................ F25B 41/37 62/324.6

(Continued)

FOREIGN PATENT DOCUMENTS

CN 101187517 A 5/2008
CN 101216198 A 7/2008

(Continued)

*Primary Examiner* — Nelson J Nieves
(74) *Attorney, Agent, or Firm* — The Webb Law Firm

(57) ABSTRACT

The present disclosure discloses a control method for a multi-split air conditioning system and a multi-split air-conditioning system, the multi-split air conditioning system, including a compressor and a plurality of indoor units respectively arranged on a plurality of parallel branches, the indoor unit including a fan and the control method including: in a cooling mode, when the multi-split air conditioning system needs oil return, the multi-split air conditioning system opening a branch where an indoor unit in an off state is located, determining whether the indoor unit has reached a dewing condition, opening the branch on which the indoor unit is located, and controlling the fan of the indoor unit according to a determination result.

13 Claims, 4 Drawing Sheets

1
21
23
2
22
2
2

(56) References Cited

U.S. PATENT DOCUMENTS

2004/0144111 A1* 7/2004 Matsuoka ............... F25B 41/22
62/224
2008/0000245 A1* 1/2008 Hong ...................... F25B 13/00
62/222
2012/0180513 A1* 7/2012 Yamashita ............ F25B 25/005
62/238.7
2012/0192581 A1* 8/2012 Kasagi .................... F25B 43/02
62/192
2015/0184923 A1* 7/2015 Jeon ........................ F25D 21/04
62/80
2016/0178245 A1* 6/2016 Choi ..................... F25D 11/022
62/115
2016/0231035 A1* 8/2016 Lee ....................... F25B 31/004
2016/0273817 A1* 9/2016 Makino ................. F25B 47/025
2018/0003419 A1* 1/2018 Ohura ...................... F24F 11/89
2018/0023870 A1* 1/2018 Ohura ..................... F25B 49/02
62/195
2018/0172305 A1* 6/2018 Son .......................... F24F 11/30
2019/0168579 A1* 6/2019 Kim .................. B60H 1/00007

FOREIGN PATENT DOCUMENTS

CN 104567106 A 4/2015
CN 105987483 A 10/2016
CN 106403192 A 2/2017
CN 106642602 A 5/2017
CN 206207681 U 5/2017
CN 107575939 A 1/2018
EP 3006845 A1 4/2016
EP 3091310 A1 11/2016
EP 3176516 A1 6/2017
EP 3640547 A1 4/2020
KR 1673846 B1 * 11/2016
WO WO-2018064910 A1 * 4/2018 ............. F24F 11/62

* cited by examiner

MULTI-SPLIT AIR CONDITIONING SYSTEM AND CONTROL METHOD THEREFOR

CROSS-REFERENCE TO RELATED APPLICATIONS

This application is the United States national phase of International Application No. PCT/CN2018/104344 filed Sep. 6, 2018, and claims priority to Chinese Patent Application No. 201710800560.9 filed Sep. 7, 2017, the disclosures of which are hereby incorporated by reference in their entirety.

BACKGROUND OF THE INVENTION

Field of the Invention

The present disclosure relates to a control method for a multi-split air conditioning system and a multi-split air conditioning system controlled using the control method.

Description of Related Art

In an air-conditioning system, after a compressor is operated for a period of time, a refrigeration oil may be circulated in the system along with a refrigerant, which causes the refrigeration oil to possibly remain in an indoor heat exchanger or in a pipe between an indoor unit and an outdoor unit. If such refrigeration oil cannot return to the outdoor unit in time, the compressor cannot be effectively lubricated and cooled by the refrigeration oil, thereby affecting the operating performance and reliability of the compressor. Therefore, after the air-conditioning system is operated for a period of time, it is necessary to perform oil return to bring the refrigeration oil brought out by the compressor during exhaust of the compressor back into the compressor, thereby ensuring normal operation of the air-conditioning system. In a multi-split air conditioning system comprising multiple indoor units, when the compressor returns oil, an electronic expansion valve of the indoor unit in an off state needs to be turned on in order to return the refrigeration oil to the outdoor unit.

SUMMARY OF THE INVENTION

According to one aspect of the present disclosure, a control method for a multi-split air conditioning system is provided, wherein the multi-split air conditioning system comprises a compressor and a plurality of indoor units respectively disposed on a plurality of parallel branches, each of the plurality of indoor units comprises a fan, and the control method comprises: in a cooling mode, when the multi-split air conditioning system needs oil return, the multi-split air conditioning system opening a branch wherein an indoor unit is an off state is located, determining whether the indoor unit reaches a dewing condition, and controlling the fan of the indoor unit according to a determination result.

According to another aspect of the present disclosure, a control method for a multi-split air conditioning system is provided, wherein the multi-split air conditioning system comprises a compressor and a plurality of indoor units respectively disposed on a plurality of parallel branches, each of the plurality of indoor units comprises a fan, and the control method comprises: in a cooling mode, during oil return of the multi-split air conditioning system, the multi-split air conditioning system controlling a branch where an indoor unit in an off state is located to be opened, and turning on the fan of the indoor unit.

BRIEF DESCRIPTION OF THE DRAWINGS

The above-described and other objectives, features, and advantages of the present disclosure will be more apparent from the following description of embodiments of the present disclosure in conjunction with the accompanying drawings, in which.

In the figures, 1, an outdoor unit; 2, an indoor unit; 21, an electronic expansion valve; 22, a fan; 23, an indoor heat exchanger.

DESCRIPTION OF THE INVENTION

The present disclosure described below based on the embodiments, but the present disclosure not only limited to these embodiments. In the following detailed description of the present disclosure some specific details are expatiated. For those skilled in the art, the present disclosure may also be fully understood without the description of these details. In order to avoid obscuring the essence of the present disclosure, well-known methods, processes, procedures, and elements are not described in detail.

In addition, those skilled in the art should understand that the drawings provided here are for the purpose of illustration, and the drawings are not necessarily drawn to scale.

Unless specifically required in the context, the words "comprising", "including", and the like throughout the specification and claims should be interpreted as inclusive rather than exclusive or exhaustive, that is, the meaning of "comprising but not limited to".

In the description of the present disclosure, it should be understood that, the terms "first", "second", and the like are used for descriptive purposes only, and cannot be understood to indicate or imply relative importance. In addition, in the description of the present disclosure, unless otherwise stated, the meaning of "a plurality of" is two or more.

The inventors of the present disclosure have found that, when the multi-split air conditioning system is operated in a coupling mode, if the compressor frequently returns oil, a problem of dewing and dripping will occur at the indoor unit in an off state for a long time, which will affect the user's experience.

Figure 1:
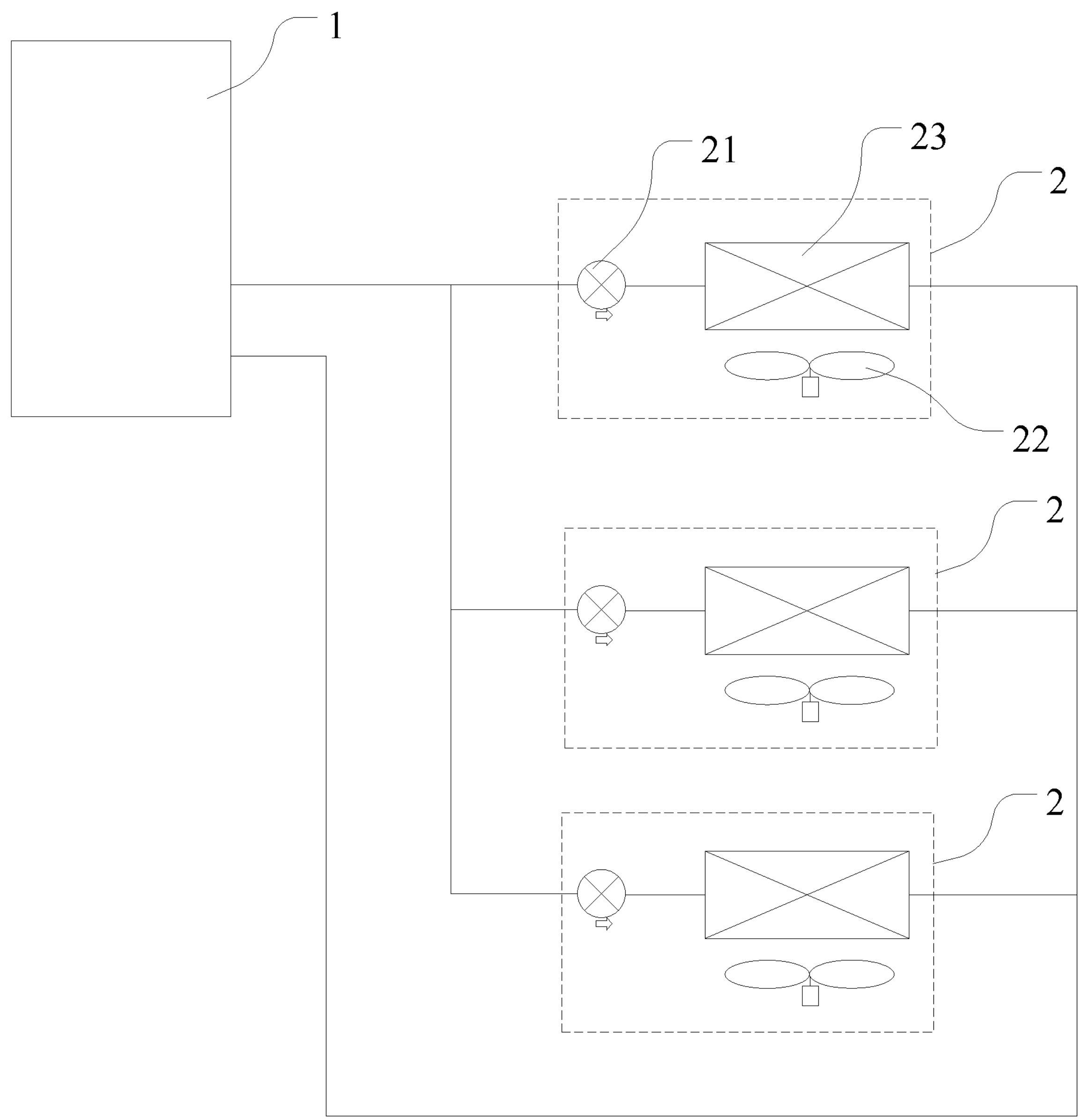
FIG. 1 is a schematic structural view of a multi-split air conditioning system provided by the present disclosure.
Figure 2:
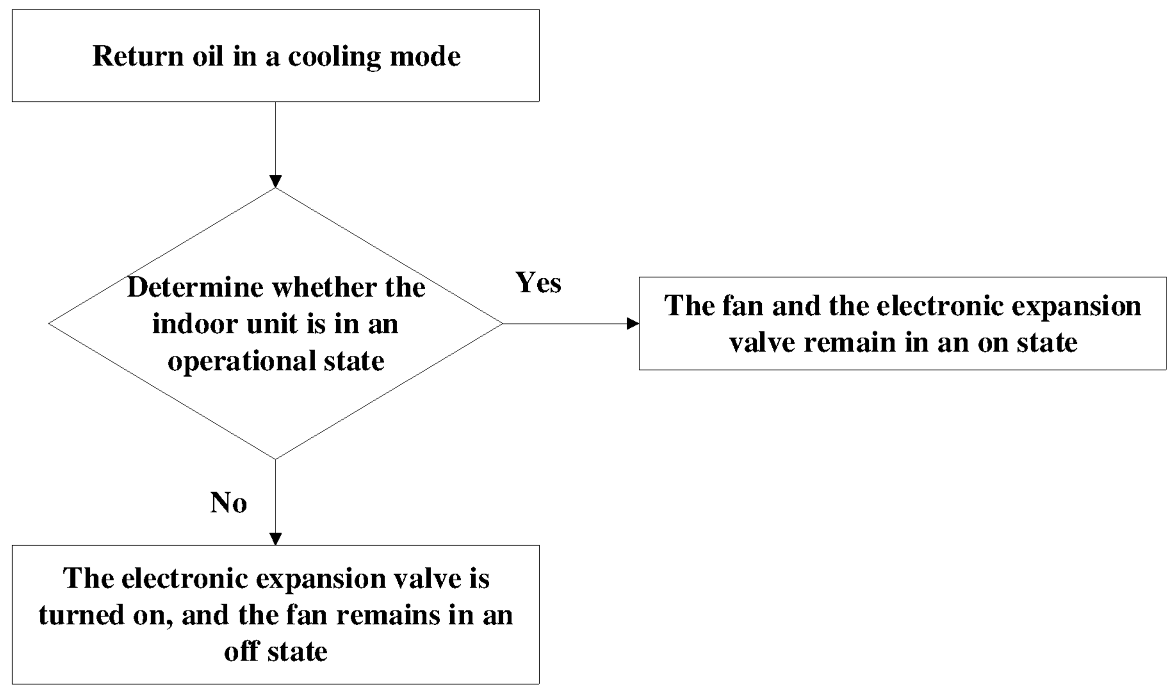
FIG. 2 shows a flow chart of a control method known to the inventors of the present disclosure when a multi-split air conditioning system returns oil.

For the problem that the indoor unit in an off state for a long time may suffer from dewing and dripping caused by frequent oil return of the compressor present in the multi-split air conditioning system known to the inventors of the present disclosure, it is found in the present disclosure that it is caused due to the reasons that the oil return control method known to the inventors of the present disclosure is not reasonable. Specifically, as shown in FIG. 1, the multi-split air conditioning system comprises an outdoor unit 1 and a plurality of indoor units 2 arranged in parallel. That is, a plurality of parallel branches are provided on the refrigerant circulation circuit, and different indoor units 2 are respectively provided on different branches to realize mutual parallel connection of the indoor units 2. The outdoor unit 1 is internally provided with a compressor, and the indoor unit 2 comprises a throttling device, an indoor heat exchanger 23, and a fan 22. The throttling device is any device capable of throttling the refrigerant, and an electronic expansion valve 21 shown in FIG. 1 is used as the throttling device to facilitate automatic control. The fan 22 is provided to drive air flow to promote heat exchange between the air and the indoor heat exchanger 23. The control method known to the inventors of the present disclosure is shown in FIG. 2. The multi-split air conditioning system is operated in a cooling mode. When the multi-split air conditioning system needs oil return, the operational state of the indoor unit 2 is determined. The fan 22 and the electronic expansion valve 21 of the indoor unit 2 in an operational state remain in an on state. Whereas, the indoor unit 2 in an off state controls the branch where the indoor unit 2 is located to be opened. For example, the electronic expansion valve 21 of the indoor unit 2 is turned on; or a solenoid valve is also provided on the branch, and the branch where the indoor unit 2 is located is opened by controlling the solenoid valve, so that the refrigerant and the refrigeration oil is circulated, and the fan 22 always maintains an off state. For the indoor unit 2 in the off state, during oil return of the system, since the fan 22 is in an off state, the low-temperature and low-pressure refrigerant is not effectively evaporated in the indoor heat exchanger 23 thereof, and the low-temperature and low-pressure refrigerant may remain in the indoor heat exchanger 23 after completion of the oil return, which results in outward transmission or radiation of the cold quantity. When the system frequently returns oil, the dewing and dripping phenomenon may occur at the indoor unit 2 in the off state for a long time.

In view of the above problem, the present disclosure provides a control method for a multi-split air conditioning system. In a cooling mode, when the compressor needs oil return, the multi-split air conditioning system determines whether the indoor unit 2 in an off state reaches a dewing condition. That is, it is determined whether there is a dewing risk in the indoor unit 2 in the off state. And different control methods are used according to different conditions, so as to solve the problem of dewing and dripping at the indoor unit 2 resulting from frequent oil return of the compressor, and improve the user's operational comfort.

Wherein, if it is determined that the indoor unit 2 in the off state does not reach the dewing condition, which means that the indoor unit 2 does not have the dewing risk, the oil return control of the indoor unit 2 is performed according to a control method known to the inventors of the present disclosure. That is, during the oil return of the multi-split air conditioning system, the electronic expansion valve 21 of the indoor unit 2 is controlled to be turned on until the oil return process ends, and the fan 22 always maintains an off state. If it is determined that the indoor unit 2 in the off state reaches the dewing condition, which means that the indoor unit 2 has the dewing risk, at this time, it is necessary to control the oil return of the indoor unit 2 by using an improved control method so as to avoid the problem of dewing and dripping on the indoor unit 2. Specifically, during the oil return of the multi-split air conditioning system, the electronic expansion valve 21 and the fan 22 of the indoor unit 2 are both controlled to be turned on until the oil return process ends, so that during the oil return, the evaporation of the refrigerant within the indoor heat exchanger 23 of the indoor unit 2 is promoted by the fan 22, so as to achieve the effect of avoiding dewing. In some embodiments, in order to reduce the impact caused by the operation of the fan 22 over the environment of the area where the fan 22 is located, the fan 22 of the indoor unit 2 is controlled to be operated at a low-grade speed during the oil return of the multi-split air conditioning system. The low-grade speed described herein is, for example, the lowest grade speed or the silent grade speed of the indoor unit.

In some embodiments, there are multiple methods for determining whether the indoor unit 2 in the off state reaches the dewing condition. For example, in some embodiments, a humidity sensor is provided in the indoor unit 2 to detect a humidity of the environment in which it is located, and it determines whether the indoor unit 2 has the dewing risk according to the humidity of the environment where the indoor unit 2 is located. That is, the dewing condition comprises: the humidity of the environment where the indoor unit 2 is located being higher than a humidity threshold. If the environment where the indoor unit 2 is located has a low humidity, it is indicated that there is a low air humidity without the dewing risk. If the environment where the indoor unit 2 is located has a high humidity, it is indicated that there is a high air humidity. If the fan 22 is not turned on, the water vapor in the air during the oil return may condense to produce a dewing. In some embodiments, the humidity detected by the humidity sensor provided in the indoor unit 2 is used as the humidity of the environment where the indoor unit 2 is located. Specifically, the humidity of the environment where the indoor unit 2 is located is obtained, and whether the humidity of the environment where the indoor unit 2 is located is higher than a humidity threshold is determined. If so, it is determined that the indoor unit 2 reaches the dewing condition. Otherwise, it is determined that the indoor unit 2 does not reached the dewing condition. The humidity threshold therein ranges 60% to 80%.

Figure 3:
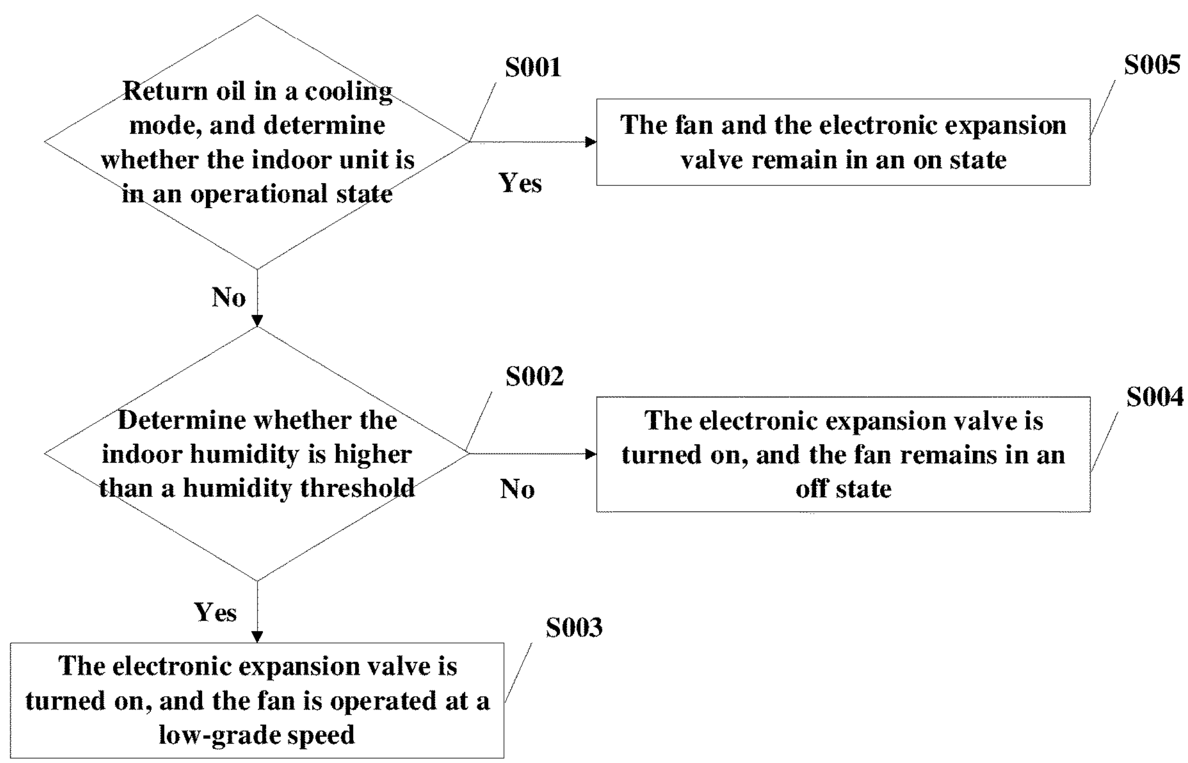
FIG. 3 shows a flow chart of a control method of some embodiments for the multi-split air conditioning system provided by the present disclosure.

As shown in FIG. 3, the method of controlling the oil return in a cooling mode by using the above-described determination manner comprises steps S001 to S005.

At step S001, when the multi-split air conditioning system needs oil return, whether the indoor unit 2 is in an operational state is determined. If so, proceed to step S005, otherwise proceed to step S002.

At step S002, the current humidity of the environment where the indoor unit 2 in an off state is located is obtained, and whether the current humidity is higher than a humidity threshold is determined. If so, proceed to step S003, otherwise proceed to step S004.

At step S003, the electronic expansion valve 21 and the fan 22 of the indoor unit 2 are both turned on, the fan 22 is operated at a low-grade speed, and the electronic expansion valve 21 and the fan 22 are turned off after completion of the oil return.

At step S004, the electronic expansion valve 21 of the indoor unit 2 is turned on, and the electronic expansion valve 21 is turned off after completion of the oil return, while the fan 22 is always in an off state.

At step S005, the operational state of the indoor unit 2 remains unchanged, and the electronic expansion valve 21 and the fan 22 maintain an on state.

In other embodiments since the dewing phenomenon is caused by frequent oil return of the multi-split air conditioning system, based on this, it is determined whether the indoor unit 2 in the off state reaches the dewing condition according to a frequency of oil return of the multi-split air conditioning system. That is, the dewing condition comprises: the frequency of oil return of the multi-split air conditioning system reaching or being higher than a predetermined frequency. When the frequency of oil return of the multi-split air conditioning system reaches or is higher than the predetermined frequency, there is a risk of accumulating excessive low-temperature and low-pressure refrigerant in the indoor heat exchanger 23 of the indoor unit 2 in the off state. If excessive low-temperature and low-pressure refrigerant is accumulated, it will also emit more cold quantity, and at this time, there is a dewing risk. When there is a low frequency of oil return of the multi-split air conditioning system, it is indicated that the cold quantity of the low-temperature and low-pressure refrigerant accumulated in the indoor heat exchanger 23 of the indoor unit 2 in the off state is not enough to cause the dewing phenomenon. In some embodiments, the predetermined frequency may is set according to a specific model and application scenario. In some embodiments, the range of the predetermined frequency is one oil return every 0.5 to 2 hours. For example, the predetermined frequency is one oil return every 0.5 hours, two oil returns every two hours, or three oil returns every three hours. In some embodiments, the predetermined frequency is four oil returns every 8 hours.

In control methods of some embodiments, the dewing condition further comprises the fan 22 of the indoor unit 2 in the off state being not effectively operated during a time period between an end of a previous oil return and a beginning of a present oil return. That is, in the case where the multi-split air conditioning system frequently returns oil, if the indoor unit 2 currently in the off state has been operated before, there is not excessive low-temperature and low-pressure refrigerant accumulated in the indoor heat exchanger 23 of the indoor unit 2, and thus there is no dewing risk. If the indoor unit 2 in the off state has not been operated before, at this time, there is much low-temperature and low-pressure refrigerant accumulated in the indoor heat exchanger 23 of the indoor unit 2, and thus there is the dewing risk.

In some embodiments, a criteria for determining an effective operation of the fan 22 comprises the fan 22 being turned on at least once. If so, it is determined that the fan 22 has been operated effectively, otherwise it is determined that the fan 22 has not been operated effectively. Since there is a little effect on the refrigerant in the indoor heat exchanger 23 when the fan 22 has been turned on for a short time, in order to improve the accuracy of the determination, in some embodiments, the criteria for determining the effective operation of the fan 22 further comprises a continuous operation time of the fan 22 exceeding a predetermined time. If so, it is determined that the fan 22 has been operated effectively, otherwise it is determined that the fan 22 has not been operated effectively. In some embodiments, predetermined time therein is set according to specific conditions. In some embodiments, the predetermined time ranges from 5 to 15 minutes, and is, for example, 5 minutes, 10 minutes, or 15 minutes.

Figure 4:
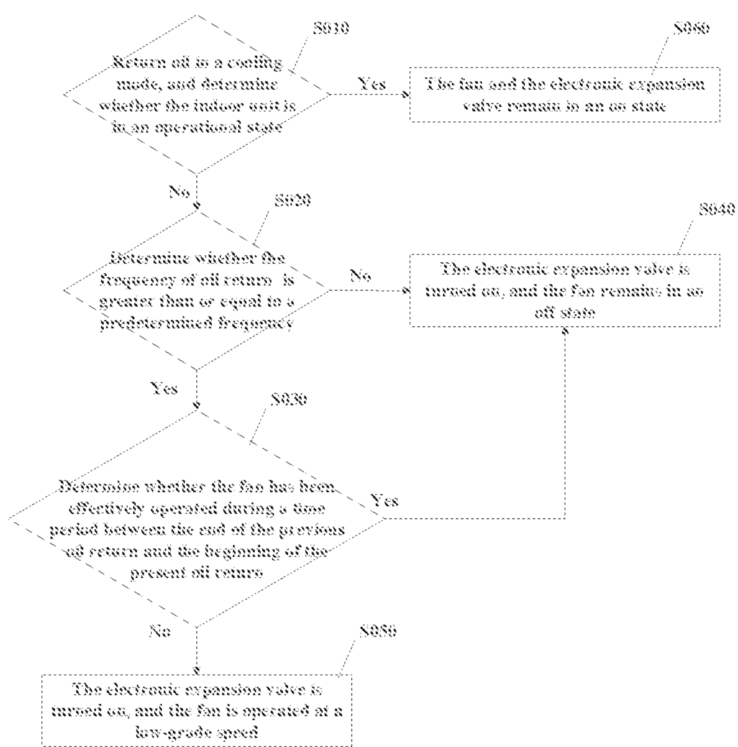
FIG. 4 shows a flow chart of a control method of other embodiments for the multi-split air conditioning system provided by the present disclosure.

As shown in FIG. 4, the method of controlling the oil return in a cooling mode by using the above-described determination manner comprises steps S010 to S060.

At step S010, when the multi-split air conditioning system needs oil return, whether the indoor unit 2 is in an operational state is determined. If so, proceed to step S060, otherwise proceed to step S020.

At step S020, whether the frequency of oil return of the multi-split air conditioning system reaches or is higher than the predetermined frequency is determined. If so, proceed to step S030, otherwise proceed to step S040.

At step S030, whether the fan 22 of the indoor unit 2 in an off state has been effectively operated is determined during a time period between the end of the previous oil return and the beginning of the present oil return. If so, proceed to step S040, otherwise proceed to step S050.

At step S040, the electronic expansion valve 21 of the indoor unit 2 is turned on, and the electronic expansion valve 21 is turned off after completion of the oil return, while the fan 22 is always in an off state.

At step S050, the electronic expansion valve 21 and the fan 22 of the indoor unit 2 are both turned on, the fan 22 is operated at a low-grade speed, and the electronic expansion valve 21 and the fan 22 are turned off after completion of the oil return.

At step S060, the operational state of the indoor unit 2 remains unchanged, and the electronic expansion valve 21 and the fan 22 maintain an on state.

It may be understood that, when the electronic expansion valve 21 is turned on, the opening degree of the electronic expansion valve 21 is set according to an actual refrigerant condition. For example, the opening degree of the electronic expansion valve 21 when turned on is controlled to be within a range of 30% to 60%.

In some alternative embodiments, it is also possible not to determine whether the dewing condition is reached. For example, in certain application scenarios, the indoor unit is always in a state having a high dewing risk. At this time, it is not necessary to determine whether the dewing condition is reached. In a cooling mode, as long as the multi-split air conditioning system returns oil, the electronic expansion valve 21 and the fan 22 of the indoor unit 2 in an off state are controlled to be turned on. some. In some embodiments, the fan 22 is controlled to be operated at the lowest speed, so that it is also possible to achieve the effect of avoiding the dewing and dripping phenomenon of the indoor unit 2 in the off state.

Those skilled in the art may easily understand that, under the premise that there is no conflict, various solutions as described above may be freely combined and superimposed.

It should be understood that, the above-described embodiments are merely exemplary but not restrictive, and those skilled in the art may make various obvious or equivalent modifications or replacements directed to the above-described details without departing from the basic principles of the present disclosure, which will be all comprised in the scope of the claims of the present disclosure.

INDUSTRIAL APPLICABILITY

The solution provided by embodiments of the present disclosure is applied to a control process of the multi-split air conditioning system. The multi-split air conditioning system comprises a compressor and a plurality of indoor units respectively disposed on a plurality of parallel branches. The indoor unit comprises a fan. The control method comprises: in a cooling mode, when the multi-split air conditioning system needs oil return, the multi-split air conditioning system opening a branch where an indoor unit in an off state is located, determining whether the indoor unit reaches a dewing condition, and controlling the fan of the indoor unit according to a determination result. In the control method for the multi-split air conditioning system provided by the present disclosure, when the compressor needs oil return, first of all, it is determined whether there is a dewing risk in the indoor unit in an off state, and different control methods are used for the fan according to different conditions, so as to solve the problem of dewing and dripping at the indoor unit resulting from frequent oil return of the compressor, and improve the user's operational comfort.

What is claimed is:

1. A control method for a multi-split air conditioning system, wherein the multi-split air conditioning system comprises a compressor and a plurality of indoor units respectively disposed on a plurality of parallel branches, each of the plurality of indoor units comprises a fan, and the control method comprises:

in a cooling mode, opening by the multi-split air conditioning system, a branch where an indoor unit in an off state is located, determining whether the indoor unit in the off state reaches a dewing condition, and controlling the fan of the indoor unit in the off state according to a determination result, so that the multi-split air conditioning system performs oil return, wherein determining whether the indoor unit in the off state reaches the dewing condition is at least based on a frequency of oil return of the multi-split air conditioning system.

2. The control method according to claim 1, wherein the control method further comprises:

when it is determined that the indoor unit in the off state does not reach the dewing condition, controlling the fan of the indoor unit to maintain an off state during the oil return of the multi-split air conditioning system; or, when it is determined that the indoor unit in the off state reaches the dewing condition, controlling the fan of the indoor unit to be turned on during the oil return of the multi-split air conditioning system.

3. The control method according to claim 2, wherein when it is determined that the indoor unit in the off state reaches the dewing condition, the fan of the indoor unit is controlled to be operated at a low-grade speed during the oil return of the multi-split air conditioning system.

4. The control method according to claim 1, wherein each of the plurality of indoor units further comprises a throttling device, and a way to open the branch where the indoor unit in the off state is located to open the throttling device of the indoor unit in the off state.

5. The control method according to claim 4, wherein the throttle device is opened at an opening degree of 30% to 60%.

6. The control method according to claim 1, wherein the dewing condition comprises: a current humidity of an environment where the indoor unit in the off state is located being higher than a humidity threshold.

7. The control method according to claim 6, wherein the humidity threshold is 60% to 80%.

8. The control method according to claim 1, wherein the dewing condition comprises: the frequency of oil return of the multi-split air conditioning system reaching or being higher than a predetermined frequency.

9. The control method according to claim 8, wherein the predetermined frequency is one oil return every 0.5 to 2 hours.

10. The control method according to claim 8, wherein the dewing condition further comprises: the fan of the indoor unite in the off state being not effectively operated during a time period between an end of a previous oil return and a beginning of a present oil return, and a criteria for determining an effective operation of the fan comprises: the fan being turned on at least once.

11. The control method according to claim 10, wherein the criteria for determining the effective operation of the fan further comprises: a continuous operation time of the fan exceeding a predetermined time.

12. The control method according to claim 11, wherein the predetermined time is 5 to 15 minutes.

13. The control method according to claim 1, wherein the control method further comprises:

when it is determined that the indoor unit in the off state does not reach the dewing condition, controlling the fan of the indoor unit to maintain an off state during the oil return of the multi-split air conditioning system; and, when it is determined that the indoor unit in the off state reaches the dewing condition, controlling the fan of the indoor unit to be turned on during the oil return of the multi-split air conditioning system.

* * * * *

UNITED STATES PATENT AND TRADEMARK OFFICE

CERTIFICATE OF CORRECTION

PATENT NO. : 11,408,633 B2
APPLICATION NO. : 16/645209
DATED : August 9, 2022
INVENTOR(S) : Huachao Jiao et al.

It is certified that error appears in the above-identified patent and that said Letters Patent is hereby corrected as shown below:

In the Claims

Column 8, Line 18, Claim 10, delete “unite” and insert -- unit --

Signed and Sealed this
Twenty-third Day of May, 2023

Katherine Kelly Vidal

Katherine Kelly Vidal
*Director of the United States Patent and Trademark Office*